United States Patent [19]
Dudley

[11] Patent Number: 5,326,095
[45] Date of Patent: Jul. 5, 1994

[54] GOLF INFORMATION SYSTEM

[75] Inventor: Douglas P. Dudley, Orlando, Fla.

[73] Assignee: Yardmark, Inc., Orlando, Fla.

[21] Appl. No.: 942,343

[22] Filed: Sep. 9, 1992

Related U.S. Application Data

[63] Continuation of Ser. No. 750,823, Aug. 27, 1991, abandoned, which is a continuation of Ser. No. 449,995, Dec. 13, 1989, Pat. No. 5,044,634, which is a continuation-in-part of Ser. No. 172,458, Mar. 21, 1988, abandoned.

[51] Int. Cl.⁵ .................. G06F 15/28; A63B 67/02
[52] U.S. Cl. ................ 273/32 R; 273/32 H; 273/176 A; 273/176 L; 340/323 R
[58] Field of Search ............. 273/32 R, 32 H, 213, 273/176 R, 176 FA, 176 L, 176 A; 364/410, 411, 424.01, 444, 460; 340/323 R, 933, 988, 989, 991; 280/DIG. 5, DIG. 6; 180/167

[56] References Cited

U.S. PATENT DOCUMENTS

| | | | |
|---|---|---|---|
| 3,182,314 | 5/1965 | Kleist et al. | 340/988 |
| 3,786,411 | 1/1974 | Kurauchi et al. | 340/23 |
| 3,868,692 | 2/1975 | Woodard et al. | 273/32 B |
| 4,027,840 | 6/1977 | Blair | 246/122 R |
| 4,136,394 | 1/1979 | Jones et al. | 273/32 H |
| 4,303,243 | 12/1981 | Wolfe | 273/176 R |
| 4,480,310 | 10/1984 | Alvarez | 364/444 |
| 4,656,476 | 4/1987 | Tavtigian | 273/32 R |
| 4,698,781 | 10/1987 | Cockerell, Jr. | 364/460 |
| 4,703,444 | 10/1987 | Storms, Jr. et al. | 273/32 H |
| 4,819,174 | 4/1989 | Furuno et al. | 364/444 |
| 4,857,886 | 8/1989 | Crews | 340/988 |
| 4,863,123 | 9/1989 | Bernard et al. | 246/122 R |
| 5,044,643 | 9/1991 | Dudley | 273/32 R |
| 5,056,106 | 10/1991 | Wang et al. | 273/32 H |
| 5,086,390 | 2/1992 | Matthews | 273/176 L |
| 5,097,416 | 3/1992 | Matthews | 273/176 L |

Primary Examiner—Jessica J. Harrison
Attorney, Agent, or Firm—Harness, Dickey & Pierce

[57] ABSTRACT

A golf information system which automatically provides golfers with reference position and distance information from a number of points on a particular golf course hole. In one embodiment, radio frequency identification tags would be positioned along a golf cart path, for example, buried underneath the path, and a reading system carried by the golf cart would output an interrogation signal which would activate the tags causing the tags to output a coded signal which would be received by the reading unit, which would retrieve information about that location from memory and output it to the golfer. The system can further be used to display advertising messages and to provide golf course management features such as monitoring cart usage and speed of play.

13 Claims, 7 Drawing Sheets

```
FROM THE WHITE TEES   229
TO SWARTZ CREEK       171
OVER SWARTZ CREEK     186
TO THE PIN            198
```
*Fig-7*
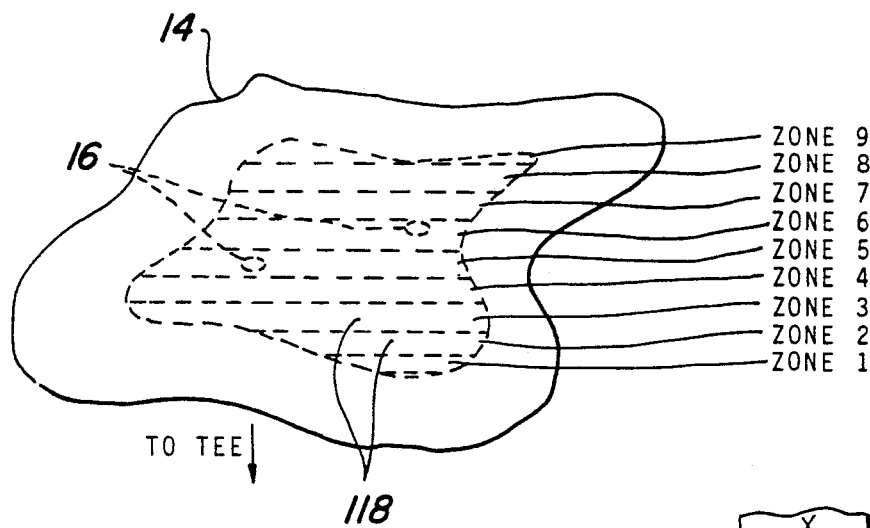
*Fig-8*
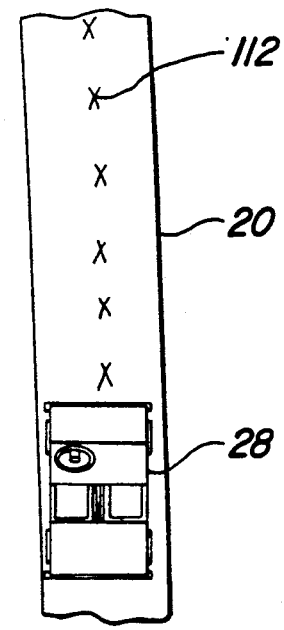
*Fig-9*

GOLF INFORMATION SYSTEM

CROSS-REFERENCE TO RELATED APPLICATION

This application is a continuation of Ser. No. 07/750,823, filed Aug. 27, 1991, now abandoned, which is a continuation of 07/449,995, filed Dec. 13, 1989, now U.S. Pat. No. 5,044,634, which is a continuation-in-part of Ser. No. 07/172,458, filed Mar. 21, 1988, now abandoned.

BACKGROUND AND SUMMARY OF THE INVENTION

This invention relates to a system for providing yardage and position information at various points on a golf course hole as a golfing aid.

The game of golf has endured through the years as a test of man's subtle coordination. Powerful men must restrain their strength in favor of timing, touch, and strategy. Variations in a golfer's swing, body alignment, grip, and tempo combine with wind, weather, trees, hills, sand and water to make golfing consistency an elusive goal.

Professional golfers know the importance of eliminating as many variables from the game as possible in order to improve their scores. They use precision weighted clubs and new balls without scars or ovality. They practice their club swing for hours striving to create a consistent or "grooved" swing. When the professionals reach a tournament course, they carefully study the tees, greens and hazards to plan their game strategy. One of the key aspects of strategy is knowing yardages from various points on the course to the green, and yardages to various hazards, such as water or sand traps. The yardage information enables the golfer to plan ball placement strategy and select the proper clubs for given distances. The luxury of inspecting and carefully planning golf strategy is not afforded the amateur golfer, even though they are just as concerned with knowing yardage information to the greens or hazards. The amateur cannot spend the time necessary to evaluate their ball positions accurately since play would become extremely slow and many courses do not have even the most rudimentary yardage references, such as the markers often used to designate a position 150 yards from the center of green.

Various mechanized approaches toward determining the yardage to various points or hazards are presently known. Examples of such systems include optical rangefinders which is trained on a target such as the pin flag and calculates the exact distance through triangulation. Other approaches using radio frequency communication technology are also known for measuring distance to a target. Although such devices would likely provide the desired range information, they violate the rules of golf since they find exact distances. In addition, such devices are "active" devices in that they require a golfer to take some special steps each time yardage information is needed which would slow down play, and would likely be viewed as unfair and awkward to other players. Moreover, such devices do not find distances to other significant course landmarks such as sand traps or water hazards, or features hidden from view.

The golf information system in accordance with the various embodiments of the present invention improves over prior art systems in that these embodiments generally provide information for the golfer as to range and position which would have the effect of speeding up play, and are passive in the sense of not requiring special attention each time information is desired. The system of the present invention, in one embodiment, includes a number of radio frequency (r.f.) identification transponders or "tags" which are buried in the ground along certain designated paths of a golf course hole or are positioned to define a two dimensional matrix across the hole surface, each of which contains a characteristic coded identification signal. A reading device, preferably mounted to a golf cart, passes over the tags and activates them causing them to transmit their coded signal. The code is then processed by the reading system to retrieve a set of information from a programmed look-up table in memory which is outputted and visually displayed to the golfer. Accordingly, as the golf cart moves about the hole, range and position information is provided at various incremental positions. Such information would include yardage information to the green and hazards, and perhaps distance from the tee. Using this information, the golfer would then estimate the true distance of his or her ball to the green or hazards by considering the cart position with respect to the ball.

This system would not violate the rules of golf since it requires a degree of golfer's skill and judgment in adjusting their club selection and strategy as compared with the designated reference points defined by the tags. It is further passive in that it does not require active participation by the golfer who merely reads the information from a digital display on the golf cart. Various types of information besides position and yardage could also be outputted by this system including advertising messages displayed at preselected times, and information regarding speed of play. Since the system would give the golfer additional information about range and positions, it would improve golf scores and thus reduce the time of play which provides commercial advantages for the golf course operator. Since the r.f. identification tags would be preferably buried in the ground, they would not in any way detract from the natural beauty of the golf course. Moreover, the tags could be positioned only along preselected golf cart paths as a means of reducing damage to the course caused by golf carts being operated in unauthorized areas since the information system would be inoperative in such areas.

The system of the present invention, in another embodiment, utilizes a plurality of transmitters, each of which is coupled to an antenna, which are buried across each of the fairways (or the golf cart paths) of a typical golf course and which transmit positional information to the golf cart, and hence to the golfer, as the cart passes thereon. This aforementioned alternative embodiment employs a transmitter having two oscillators operating at different frequencies. Each of these oscillators feed separate driver circuits which are coupled to a key modulator.

A digital signature generator is coupled to the key modulator and causes the key modulator to select one of the driver circuit outputs to an antenna. In this manner, a digital positional signature is transmitted to terms of the frequencies associated with the oscillators. The review, of this embodiment, utilizes a key demodulator which converts the received frequency signals to substantially the original output of the signature generator.

A third embodiment of this invention utilizes a radio frequency link between a golf cart and a clubhouse in order to give golf course management positional information of the golf carts on the course.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 7 presents an illustrative output of information for the golfer provided by the first embodiment of the system of FIG. 2.

FIG. 8 is a plan view of a golf course green illustrating a means for adjusting information outputted by the golf information system, shown generally in FIG. 2, for various green pin positions.

FIG. 9 is a plan view of a cart path incorporating programmable tags for inputting pin position information to the reading system.

DETAILED DESCRIPTION OF THE INVENTION

Figure 1:
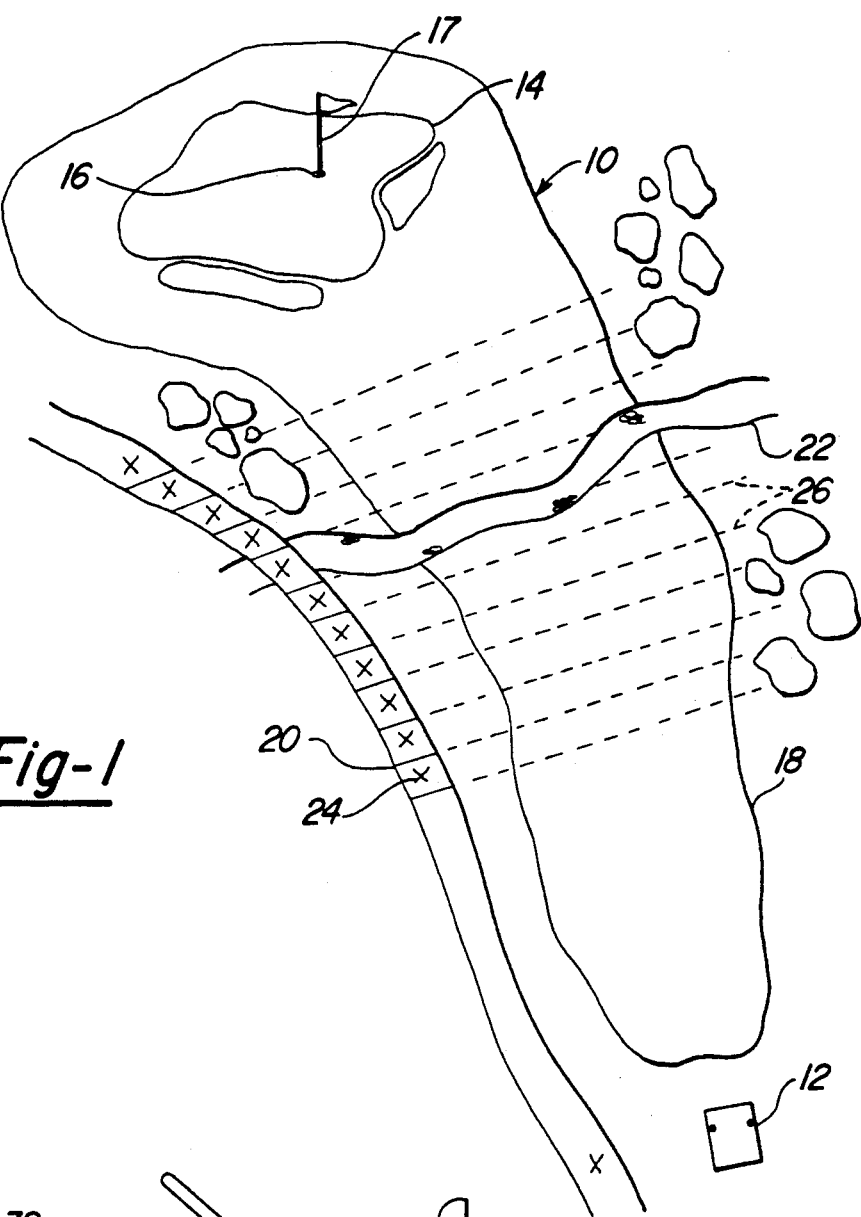
FIG. 1 is a plan view of an illustrative golf course hole incorporating elements of the golf information system according to a first embodiment of this invention.

With reference to FIG. 1, a representative golf course hole generally designated by reference number 10 is shown with a tee area 12, creek 22, and a green 14 having a cup 16 which supports the flag or "pin" 17. On the left-hand side of fairway 18, a designated golf cart path 20 is provided. The golf course hole 10 shown in FIG. 1 incorporates the golf information system in accordance with a first embodiment of this invention in which a number of radio frequency (r.f.) identification tags 24 are buried beneath cart path 20 at a number of points as designated by the "X" marks in the figure. Tags 24 could be regularly spaced at intervals of several yards or more. When a reading system 30 for the tags 24 is positioned over any one of the tags 24, an interrogation signal emanating from the reading system causes the tag to output its internally stored characteristic coded signal which is interpreted by the reading system to output information to the golfer as to the range from that point to the green, and additional information such as the distance to a hazard such as creek 22 from the point, etc. While the operator is receiving the information at the preselected points of tags 24, they can judge the true distance of the position of their ball to the cup 16. Thus, fairway 18 can be thought of as being divided into a number of regions 26 over which information from a particular tag 24 is relevant. In an alternate configuration of this first embodiment, fairway 18 could have a larger number of tags 24 positioned in a two dimensional matrix so that readings are available at a multitude of points without requiring cart 28 to remain on path 20. When deployed in such a matrix, several tags 24 may output the same coded signal since a particular set of range and position information may be valid at numerous points.

Figure 2:
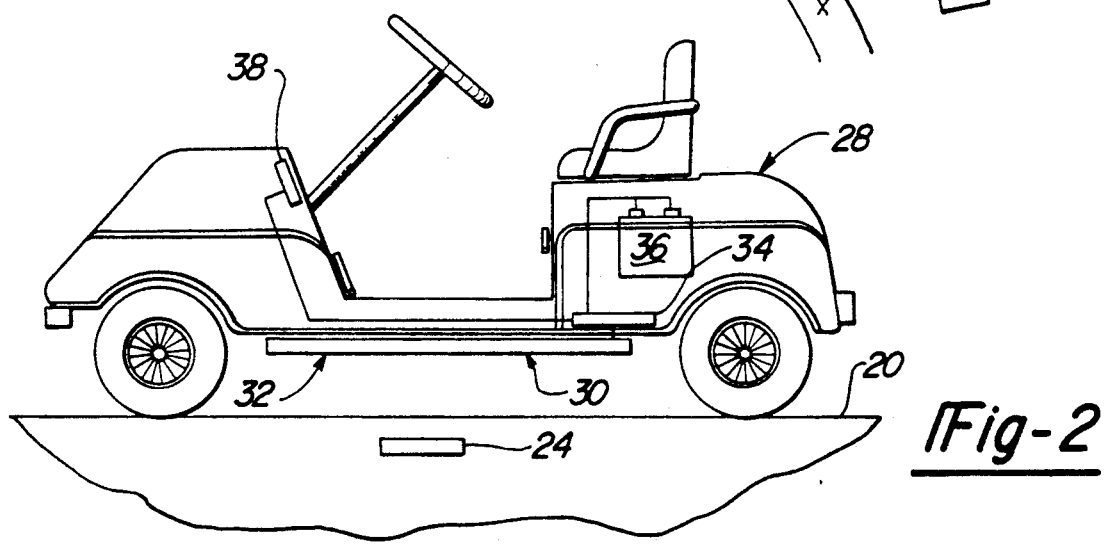
FIG. 2 is a schematic diagram of a golf cart incorporating elements of the golf information system in accordance with the first embodiment of this invention and showing a radio frequency tag buried in the ground.

A description of the physical components and electronic systems of a golf information system according to the first embodiment of this invention will be made with reference to FIGS. 2 through 6. A description of the operation of the system will be provided following the physical description of the elements. FIG. 2 shows golf cart 28 which carries an r.f. identification tag reading system 30. Reading system 30 principally comprises antenna assembly 32, r.f. interrogator board 34, battery 36, and computer and display board 38. Identification tag 24 is shown in the figure buried below cart path 20.

Figure 3:
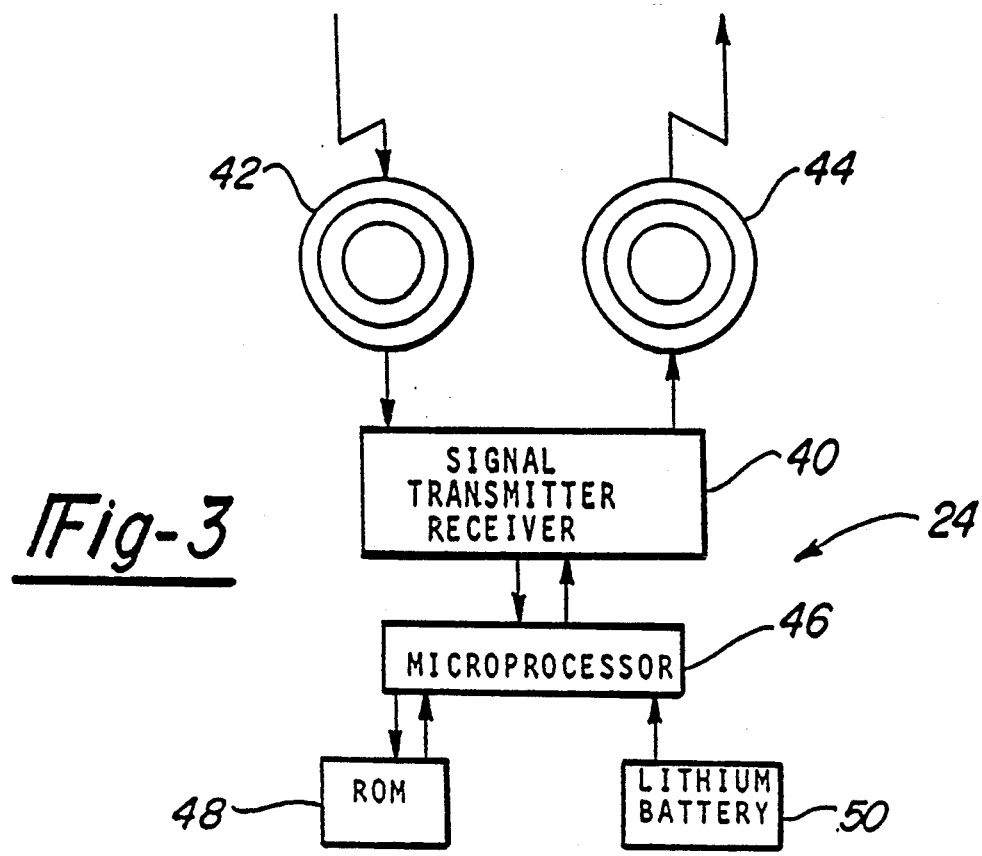
FIG. 3 is an electrical schematic diagram showing the functional subsystems of the r.f. identification tag used in conjunction with the first embodiment of this invention.

With reference to FIG. 3, the internal functional subsystems of a tag 24 are shown. Tag 24 includes a signal transmitter-receiver 40 which receives an interrogation signal through receiving coil antenna 42 and drives transmitting coil antenna 44 which provides a digitally coded message. Signal transmitter-receiver 40 is controlled by microprocessor 46. ROM 48 stores a unique code associated with that particular tag 24 which distinguishes it from other tags on the particular golf course which are positioned differently with respect to significant course features. Lithium battery 50 powers the system. With present day technology, lithium battery 50 can be expected to provide several million or more reading cycles and will likely last a period of three or more years. As an alternative, a passive type identification tag could be employed which is activated and operated entirely by power outputted from the reading station.

Tag 24 is designed to minimize battery drain by remaining in a quiescent state after each reading cycle. When an appropriate interrogation signal is received, the system is activated to fetch a digitally coded word from ROM 48 and outputs it through transmitting coil antenna 44. In one embodiment developed by this inventor, tags were used employing a twelve bit (i.e., three binary numbers) identification message which is outputted through transmitting coil antenna 44 in serial fashion. If more than 999 discrete coded signals are needed at a particular golf course, more binary members could be used so that an appropriate number of unique codes will be available. Once the message has been transmitted (preferably several times) tag microprocessor 46 causes it to return to a quiescent state. In order to ensure discrimination between the interrogation and identification signals, some frequency separation between them is desirable. As presently contemplated, an interrogation signal would be broadcast at 132 KHz, whereas the identification signal would be at 66 KHz. Tag 24 would preferably include an internal housekeeping system which monitors the voltage of battery 50 and outputs a "low battery" signal which is received and stored by reading system 30 to alert an operator of the need to replace that particular tag 24. With present technology, tag 24 can be miniaturized to the size of a very small cube or card. All that is necessary for installation is that the ground be separated and the tag 24 dropped into the earth and covered. Since tag 24 needs to be encapsulated for environmental protection, once a particular tag failed, it would likely be replaced rather than serviced.

Figure 4:
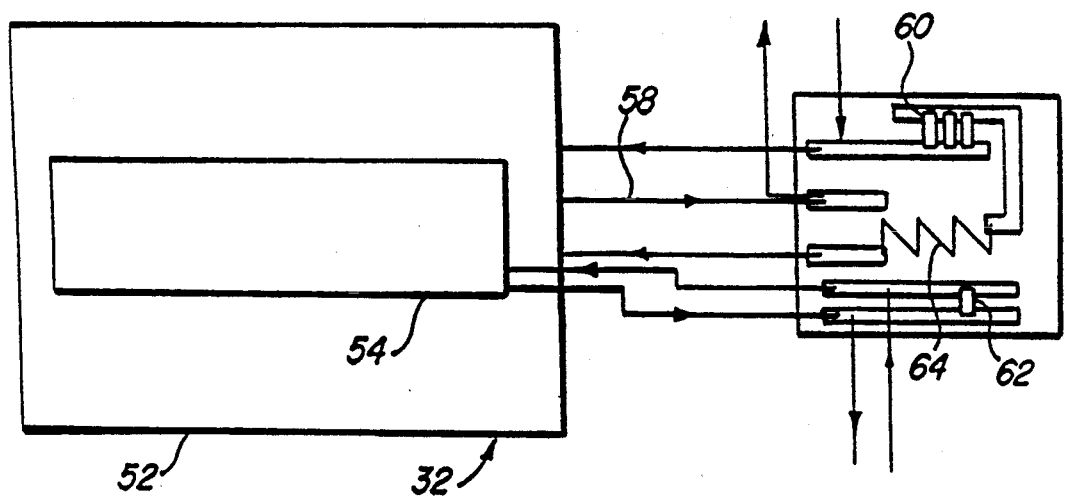
FIG. 4 is a schematic diagram of the antenna system used with the reading system of the first embodiment of this invention, and carried by a golf cart.
Figure 5:
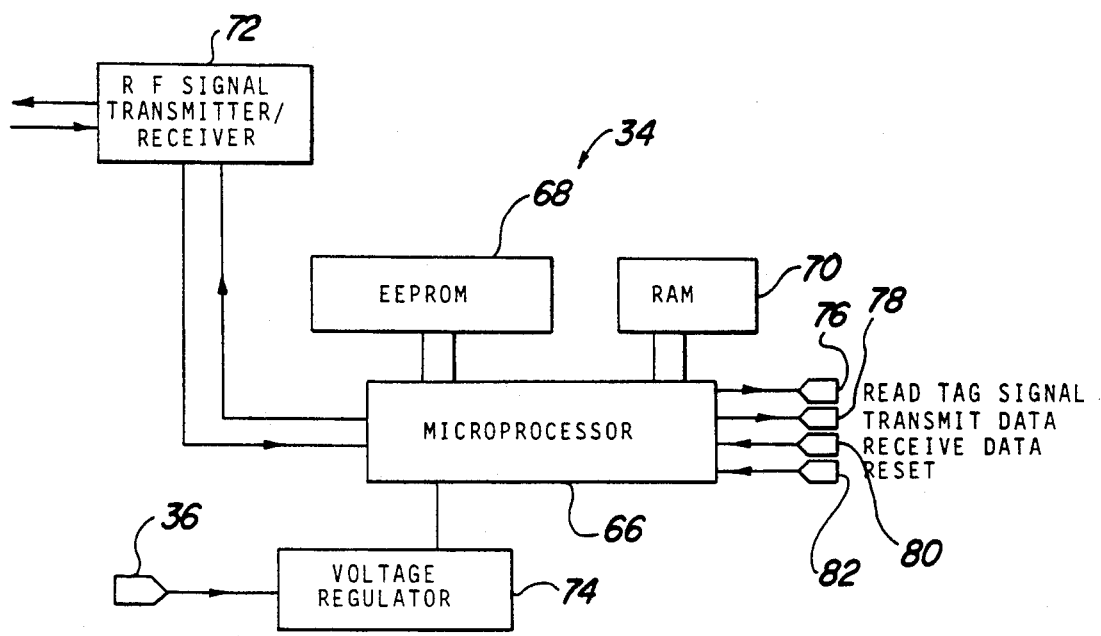
FIG. 5 is an electrical schematic diagram of the functional subsystems of the r.f. identification tag interrogator shown generally in FIG. 2.
Figure 6:
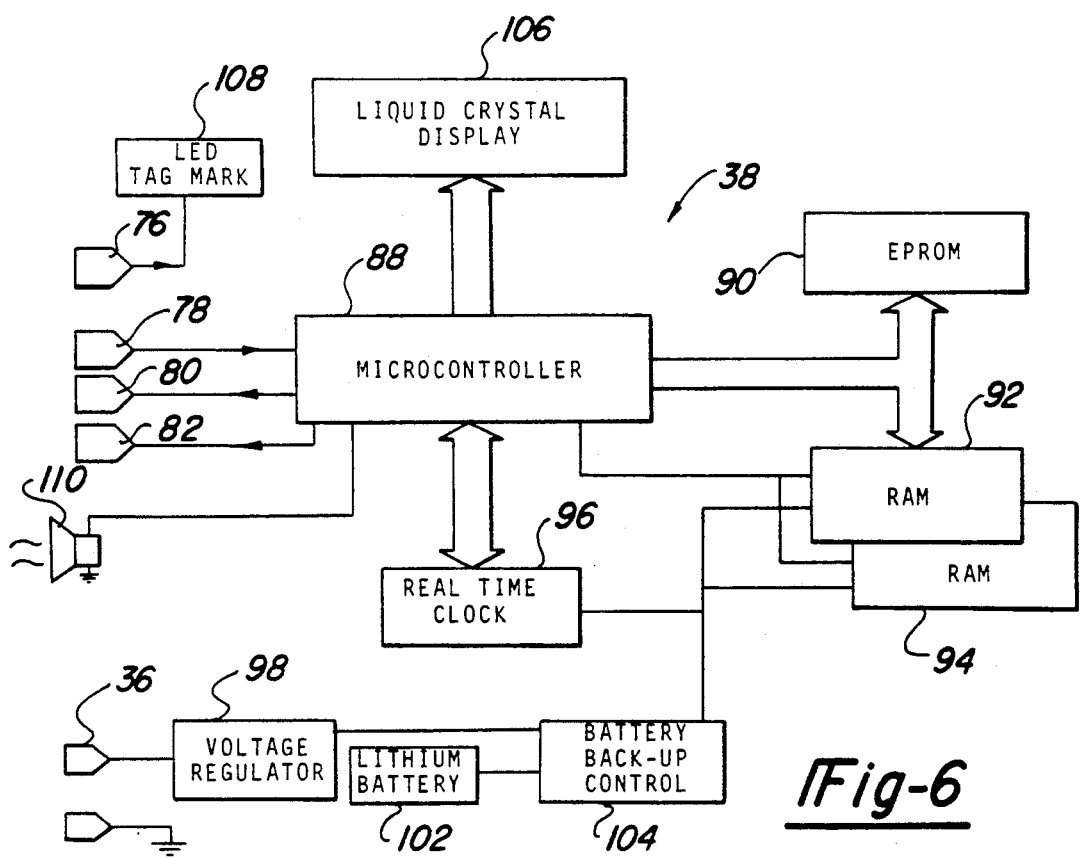
FIG. 6 is an electrical schematic diagram of the functional subsystems of the reading system microcontroller shown generally in FIG. 2.

FIGS. 4 through 6 illustrate various elements of reading system 30. With reference to FIG. 4, antenna assembly 32 is shown which consists of two separate loops, transmitting loop 52 and receiving loop 54. In one experimental embodiment, transmitting loop 52 includes four turns of wire and has center draw line 58 to allow for opposing fields to be generated for electrical noise filtering. Fixed capacitors 60 and variable capacitor 64 are used to tune transmitting loop 52 to maximum resonance. Receiving loop 54 encompasses a smaller area and is also a four turn coil with tuning capacitor 62 but is connected to flow unidirectionally. As mentioned previously, the interrogation and identification signals are transmitted at different frequencies and antenna loops 52 and 54 are matched to these frequencies for optimal performance. The range of loops 52 and 54 is intentionally limited so that the position outputted to the golfer will be accurate to, for example, plus or minus one yard.

Interrogator board 34 is shown in detail in FIG. 5 and includes microprocessor 66 having its operating system software stored on EEPROM 68 and RAM 70. Microprocessor 66 drives r.f. signal transmitter-receiver 72 connected to antenna assembly 32 which operates in a manner similar to that of tag transmitter-receiver 40, except that it broadcasts at the interrogation signal frequency and receives at the identification signal frequency. Voltage regulator 74 receives power from golf cart battery 36 and provides a filtered and controlled power supply for reading system 30. As shown in FIG. 5, a number of data input and output signal lines are provided for microprocessor 66, including read tag signal 76 and transmit data signal 78 which are outputted from microprocessor 66, and receive data signal 80 and reset signal 82 which are inputs. Operation of reading system 30 in response to signal from lines 76 through 82 will be described in greater detail below.

The functional components and subsystems of computer and display board 38 are shown with reference to FIG. 6. Microcontroller 88 has its operating system stored on EPROM 90 and several RAM chips 92 and 94 are provided for data storage. Real time clock 96 provides a time-of-day reference and can be used for displaying a local time message to the golfer and/or timing the golfers progress through the course. The power supply for computer and display board 38 is the golf cart battery 36 and also includes voltage regulator 98.

Lithium battery 102 and battery backup control 104 are provided to retain stored information upon interruption of power from golf cart battery 36. Microcontroller 88 drives display 106 which is preferably a liquid crystal type since they are easily read in bright sunlight. The transmit and receive data signals 78 and 80 are inputted to microcontroller 88, and reset signal 82 is outputted. The read tag signal 76 directly drives an LED tag marker 108 to indicate to the user that reading system 30 is receiving an identification signal. Receive data signal 80 is provided to activate the system to enable control over the use of the identification system. Normally, signal 80 is in a state to cause interrogation r.f. signal transmitter-receiver 72 to continuously transmit an interrogation signal. When a tag has been activated and the coded message received, reset signal 82 prepares reading system 30 for another reading cycle. The transmit data line 78 consists of the coded signal outputted from tag 24 which has been processed and reformatted by microprocessor 66.

Operation of the golf information system according to the aforedescribed first embodiment of this invention will now be described in view of the above description. Assuming that the system is activated, an interrogation signal is continually outputted from reading system antenna loop 52. If one of tags 24 receives the appropriate interrogation signal through receiving coil 42, the tag is activated to output its unique three (or more) digit binary identification signal which is received by receiving coil 54. The ranges over which the interrogation and identification signal can be received is intentionally limited so that reading system will interact with only one of the numerous tags 24 placed about the golf course and provide the desired position accuracy. Reception of the tag identification signal activates LED 108. The software of the operating system of interrogator board 34 measures the time over which the identification signal is received. If cart 28 is moving at a speed slow enough to allow tag 24 to remain in communication with the reading system 30 for a preselected time period, for example, 0.2 seconds, the position and yardage information is displayed. If the speed of golf cart 28 is excessive thus not providing sufficient time for reading system 30 to receive the identification signal, a display message is provided noting that the information is available but only if the cart speed is reduced.

The signal outputted by tag 24 received by receiving antenna 54 is processed at microprocessor 66 and transmitted to microcontroller 88 which fetches a set of instructions from a look-up table contained in EPROM 90 and/or RAMs 92 and 94. The signal from microprocessor 66 on line 78 is sent to microcontroller 88 in serial fashion, for example, as a 12 bit word at 1200 baud. As mentioned previously, signals having more binary digits could be used for discrimination of a larger number of tags 24. FIG. 7 illustrates a representative output generated by one of tags 24 which provides information as to the distances of a reference point from the tee 12, to and over the water hazard 22, and to the pin 17. As is evident from FIG. 7, the information outputted to the golfer would necessarily require more digital bits to define than the three binary digit signal from tag 24. In other words, tags 24 do not directly output all the information presented to the golfer in accordance with conventional r.f. identification practices. By using a simple tag code which is correlated to a detailed set of stored information, the size of tag memory is minimized, the reliability and speed of tag information transmission is enhanced, and modifications to the outputted information can be easily achieved by reprogramming reading system 30.

In addition to the above features, the golf information system according to this first embodiment also provides the capability of providing a number of additional functions and features. With the input from real time clock 96, microcontroller 88 can measure the elapsed time between the readings from a series of tags 24 on a particular hole or throughout the golf course as a means of measuring the time of play for a particular hole or a segment of the course. If play is excessively slow, a prompting message can be displayed which may also be supplemented by an audible signal from emitter 10. The look-up table contained in EPROM 90 and RAMs 92 and 94 for microcontroller 88 can also include advertising messages which are activated by particular tags 24. With appropriate programming, individuals who choose not to pay for the use of golf information system may still receive the advertising information. The system can also contain a number of housekeeping functions. For example, an internal count can be made of the number of reading cycles by a particular golf cart to evaluate cart usage and a low battery signal could be outputted by tag 24 to alert the operator of the necessity of maintenance.

Another refinement for the subject golf information system, of this first embodiment, comprehends changes in the positioning of cup 16 on the surface of green 14 which has the effect of changing the distance from the reference points provided by tags 24 to the cup. As shown in FIG. 8, the area of green 14 wherein cup 16 could be positioned may be divided into a plurality of designated zones, for example, nine separate zones 118, which extend perpendicular to the direction of the typical approach shot. Each zone may have a distance depth of, for example, about one yard. Once the cup positions on each of the golf course greens are established, a determination is made as to which zone that cup position falls into. The zone position for each hole is then recorded and coded. For example, for the first hole, if the cup falls within zone 5, that information could be coded as 015, similarly, the 18th hole at zone 2 would be coded as 182, etc. As shown in FIG. 9, one or more programmable tags 112 could be provided at the beginning of the golf cart path 20 which would preferably be located at the exit of the golf cart storage area. An authorized individual would drive cart 28 over programmable tags 112, which would load the pin position data into reading system 30 and stored at RAM 92 and/or 94 for later retrieval. This information would then be used to incrementally decrease or increase the distance to the pin information outputted to the golfer, as appropriate, and thus custom tailer the system output for changes in the course. All of the information stored within the reading system memories would be downloaded from a personal computer for convenient programming.

Figure 10:
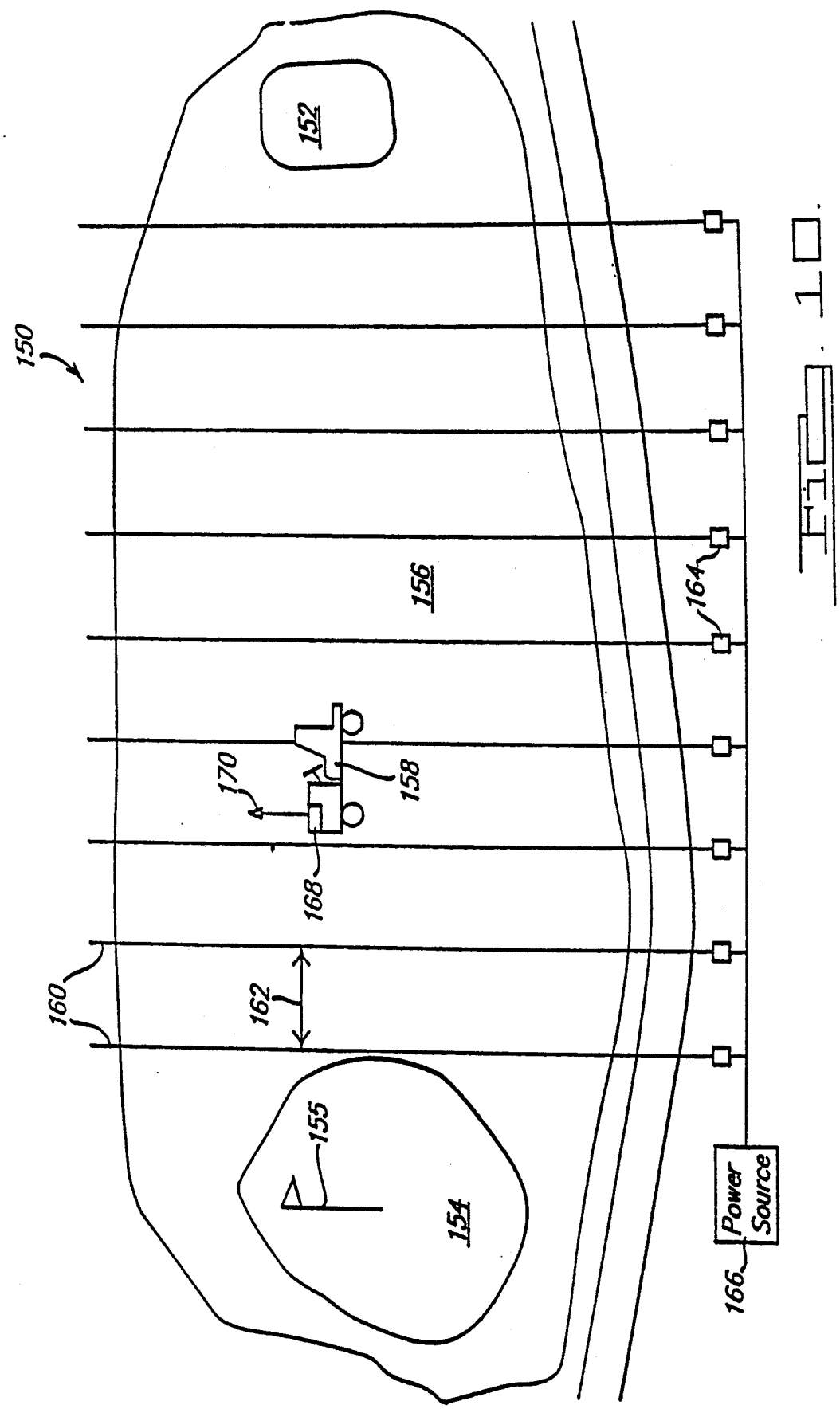
FIG. 10 is a plan view of an illustrative golf course hole incorporating elements of the golf information system according to a second embodiment of this invention.

A second embodiment of the golf information system of this invention is shown in FIG. 10, as deployed upon a typical golf course hole 150, containing a tee 152 and a typical green 154, which are physically separated by a fairway 156 and further having a cart path 157 traversing generally alongside fairway 156. A typical golf cart 158 is usually made to traverse the fairway 156 during the play of golf hole 150.

According to the teachings of the second embodiment of this invention, a plurality of buried antennas 160 may be placed generally across the fairway 156 thereby defining distances 162 therebetween. Each of the antennas 160 are connected, in this second embodiment, to a radio frequency transmitting unit 164 which is itself connected to a source of electrical power 166. Each antenna 160 defines a unique position upon hole 50.

The golf cart 158, according to the further teachings of this second embodiment of this invention, is made to contain a radio frequency transmitting/receiver unit 168 which is electrically coupled to an antenna 170 thereon. During operation, each transmitter unit 164 transmits digitally encoded signature data to the golf cart 158 as the golf cart 158 passes over the antenna 160 to which that unit 164 is connected thereto. This signature data defines the location of the antenna 160 upon fairway 156 thereby giving the golf cart 158 an indication of its placement upon fairway 156 and the distance between the golf cart 158 and the green 154 or the flag 155 thereon.

Figure 11:
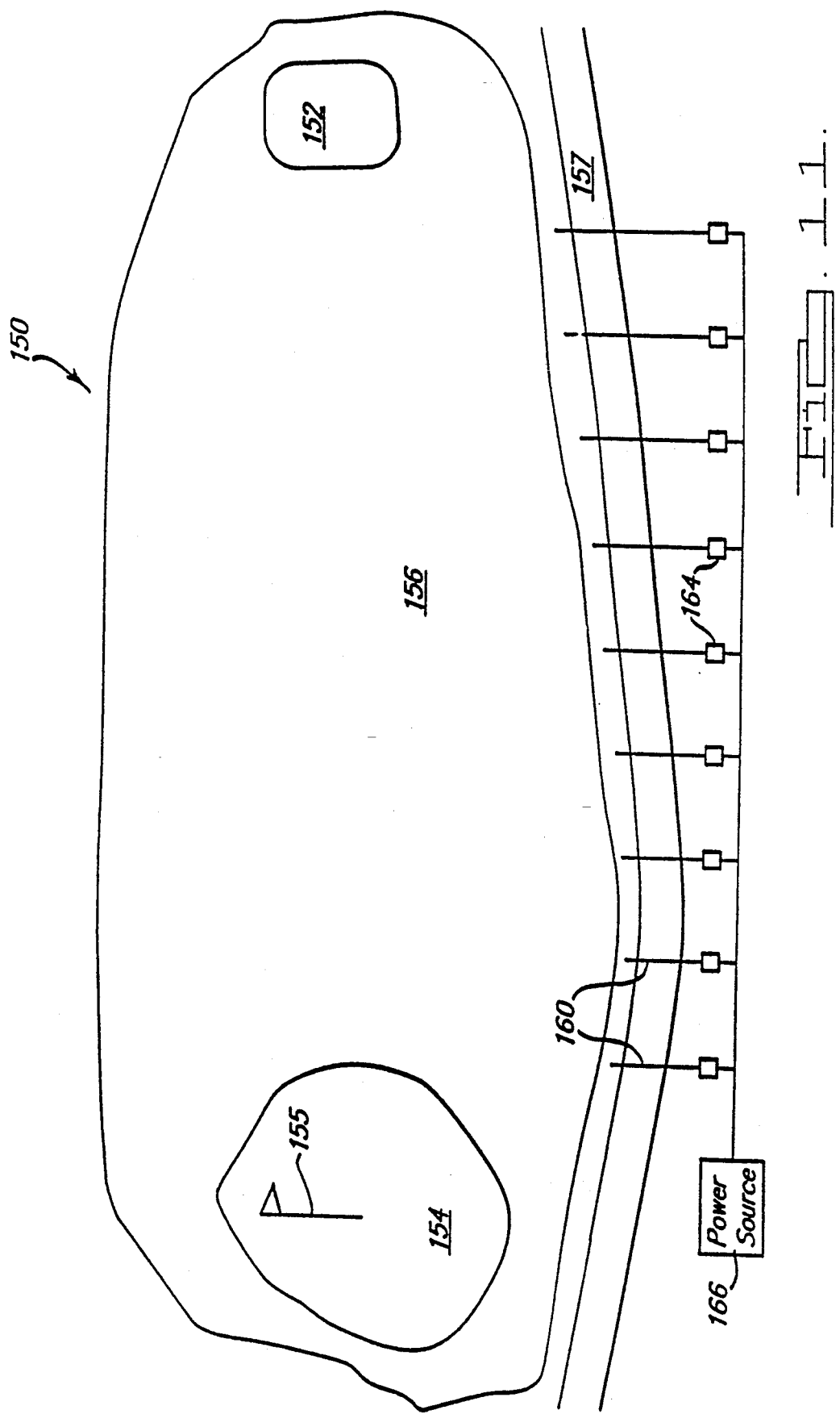
FIG. 11 is a plan view of an illustrative golf course hole incorporating elements of the golf information system according to a second configuration of the second embodiment of this invention.

A second configuration of the second embodiment of this invention is generally shown in FIG. 11, in which the plurality of antennas 160 is confined to and buried within the cart path 157. This is particularly advantageous in situations in which the golf cart 158 may not be driven over fairway 156 and is limited only to a traversal of cart path 157. This is usually done in order to maintain the overall quality of fairway 156 and reduce the wear from play. The signature data from the transmitter units 164 are sent in the aforementioned manner to each of their corresponding antennas 160 and is received by the golf cart 158 as it passes over these antennas 160 during its traversal of cart path 157.

Figure 12:
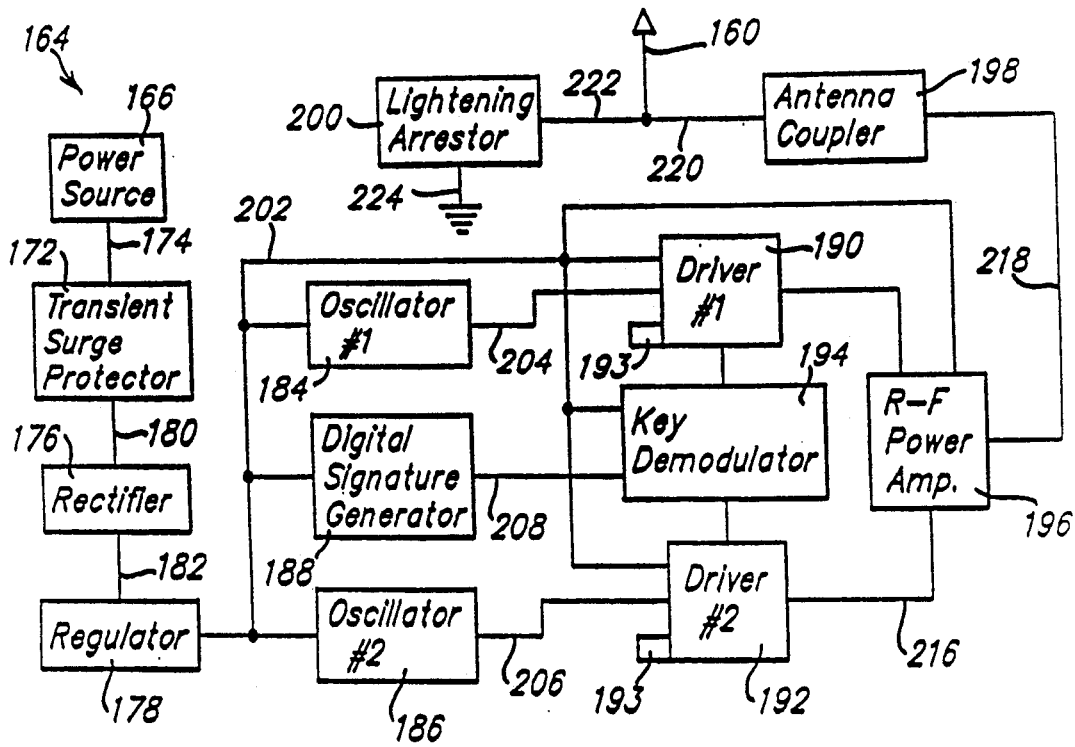
FIG. 12 is a block diagram of a radio frequency transmitter unit used by the second and third embodiments of this invention.

Referring now to FIG. 12, there is shown transmitter unit 164 as containing a transient surge protector 172 coupled to the power source 166 by bus 174. Further, transmitter unit 164 contains a rectifier 176 and a regulator 178. Rectifier 176 is coupled to the transient surge protector 172 by bus 180 and is further coupled to regulator 178 by bus 182. Transmitter unit 164 further contains oscillators 184 and 186, a digital signature generator 188, drivers 190 and 192, key modulator 194, radio frequency power amplifier 196, antenna coupler 198, and lightening arrester 200.

Specifically, the output of regulator 178 is connected to oscillators 184 and 186, digital signature generator 188, drivers 190 and 192, key modulator 194, and radio frequency power amplifier 196 by bus 202. Further, the output of oscillator 184 is coupled to driver 190 by bus 204, while the output of oscillator 186 is coupled to driver 192 by bus 206. The output of the digital signature generator 188 is coupled to the key modulator 194 by bus 208, while the key modulator 194 is additionally coupled to drivers 190 and 192 by buses 210 and 212 respectively. The output of drivers 190 and 192 are coupled to radio frequency power amplifier 196 by buses 214 and 216 respectively, while the output of the radio frequency power amplifier 196 is coupled to the antenna coupler 198 by bus 218. The output of antenna coupler 198 is connected to antenna 160 by bus 220, while antenna 160 is further coupled to lightening arrester 200 by bus 222. Lightening arrester 200 is further coupled to electrical ground by bus 224.

In operation, approximately one-hundred and twenty (+120) volts of alternating current is provided by power source 166 and is rectified and regulated, in the usual manner, by rectifiers 176 and regulator 178 respectively before being coupled to oscillators 182 and 186, signature generator 188, drivers 190 and 192, key modulator 194, and radio frequency power amplifier 196. The transient surge protector 172 provides the usual protection to radio frequency transmitter 164 in the event of a typical spike or transient surge in electrical power, particularly due to a lightening strike upon power supply 166.

Oscillators 184 and 186 provide input signals having dissimilar frequencies to drivers 190 and 192 respectively which amplify these input signals thereby producing signal outputs on buses 214 and 216 respectively to the radio frequency power amplifier 196. Drivers 190 and 192 each contain, in one configuration, potentiometers 193 which are externally accessible therefrom and connected thereto in the usual manner in order to provide an adjustment of the output level of drivers 190 and 192. The key modulator 194 operates so as to allow only one of the drivers 190 or 192 to produce an output signal to the radio frequency power amplifier 196 at any instant of time. This control is achieved by signals on buses 210 and 212 respectively. The digital signature generator 188, by signals on bus 208, defines the driver 190 or 194 that is to be activated at an instant of time by the key modulator 194. That is, the usual output of the digital signature generator 188 comprises a serial stream of logical zeros and ones. Similar values contained in this serial stream of data define a unique one of the drivers 190 and 192, while the other dissimilar values define the other driver 190 or 192.

Upon receipt of signals on buses 214 or 216, the radio frequency power amplifier 196 acts so as to amplify the input signal and produce an amplified output signal on bus 218 to the antenna coupler 198. Radio frequency power amplifier 196, in this second embodiment of the invention, is turned so as to amplify only signals having a frequency substantially similar to the frequency of signals associated with the output of drivers 190 and 192 and is further defined to be of a Class B or Class C type. The antenna coupler 198 then couples this electrical signal to antenna 160 by means of bus 220 and antenna 160 radiates the defined electrical energy, present on bus 218, to the golf cart 158, and specifically to antenna 170 thereon.

The lightening arrester 200 provides a pathway to electrical ground in the event that antenna 160 is struck by an electrical lightening energy. That is, this surge in energy received by antenna 160 will be prevented from being sent to antenna coupler 198 and thereafter to the other elements within transmitter unit 164 by arrestor 200. Rather, this lightening energy will be directed onto bus 222 and then to electrical ground through lightening arrester 200 and bus 224 thusly protecting transmitter unit 164 from very high surges in electrical energy.

Figure 13:
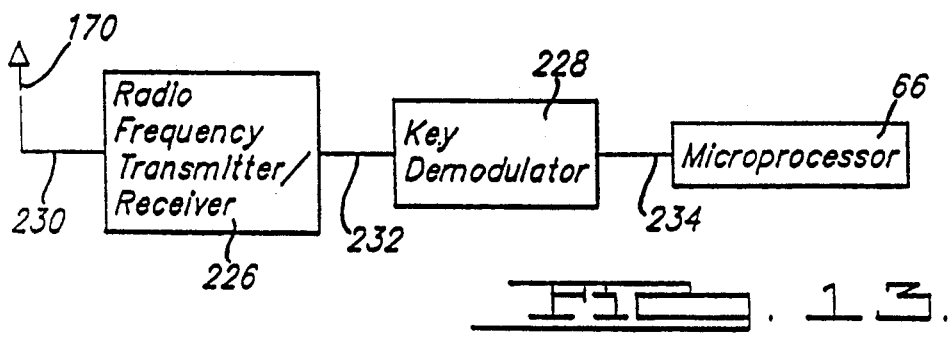
FIG. 13 is a block diagram of a radio frequency transmitter/receiver unit used upon a golf cart within the second embodiment of this invention.

Referring now to FIG. 13, there is shown details of the radio frequency transmitter/receiver unit 168 used in the second embodiment of this invention and containing an antenna 170, a radio frequency transmitter and receiver 226, a key demodulator 228, and the microprocessor 66 (shown generally in FIG. 5). Antenna 170 is coupled to the radio frequency transmitter receiver 226 by bus 230 while the radio frequency transmitter receiver 226 is coupled to the key demodulator 228 by bus 232. The output of the key demodulator 228 is coupled to the microprocessor 66 by bus 234.

In operation, the signals which are output from antenna 160 are received by antenna 170 and then input to the radio frequency transmitter and receiver 226 by signals on bus 230. Thereafter, the received radio frequency signals are input into the key demodulator 228 by bus 232, where the received signal is demodulated thereby producing the original stream of data originally appearing on bus 208. Demodulator 228 then impresses this data upon bus 234 to the microprocessor 66. Microprocessor 66 then functions in conjunction with microcontroller 88 and entities 68, 70, 90, 92, and 94, shown in FIGS. 5 and 6 in the aforementioned manner to receive and interpret the digital signature data originally appearing on bus 208.

Figure 14:
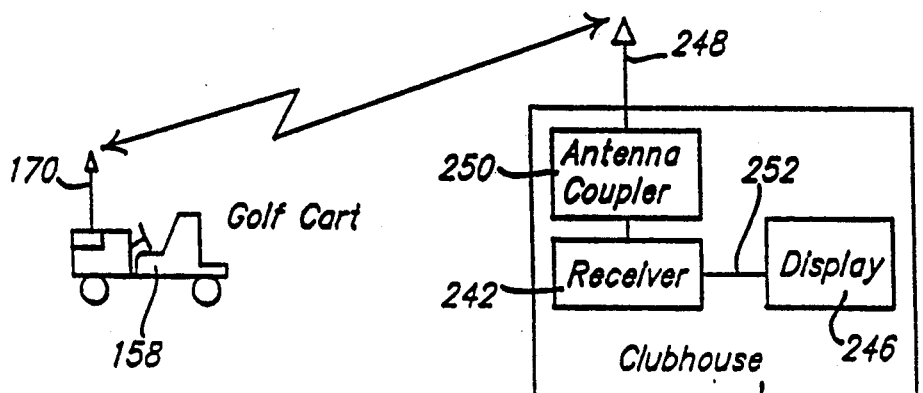
FIG. 14 is a block diagram of a third embodiment of the golf information system of this invention.

Referring now to FIG. 14, there is shown golf cart 158, in conjunction with a typical golf course club house 240, in which a radio frequency receiver unit 242 and a typical display (i.e., cathode ray tube type) 246 are housed. Specifically, radio frequency receiver 242 is coupled to antenna 248 by antenna coupler 250 and is further coupled to display 246 by bus 252. In operation, the digital signature upon bus 208 is sent by antenna 170 of golf cart 158 to antenna 248 which couples it to receiver 242 which then places it upon bus 252 to the display 246. The receiver 242 would normally contain a key demodulator 228 as shown in FIG. 13 in order to reproduce the signature data from the radio frequency data. In this embodiment, the digital signature generator generates a golf cart signature as well as the aforementioned distance signature upon bus 208 and current time data. Display 246 then visually displays the golf cart positioned information relative to golf cart 158 and the associated digital distance data as well. In this way, the management of the typical golf course could determine where each of the plurality of golf carts 158 are located at any given time upon the golf course and could, by observing the display 246 over a period of time, determine the approximate speed of play associated with users of golf cart 158. This could be used to potentially speed up the overall play upon a typical golf course. In this embodiment, a message may also be displayed upon display 106 by microcontroller 88 if too much time has elapsed during the play of a single golf hole 150.

While the above description constitutes the preferred embodiments of the present invention, it will be appreciated that the invention is susceptible to modification, variation and change without departing from the proper scope and fair meaning of the accompanying claims.

I claim:

1. A golf information system providing a golfer with information regarding the distance to designated points relative to various positions on a golf course hole comprising:

a movable receiver including antenna means for receiving at least one signal from which the position of said receiver on the golf course is determined, said receiver interpreting said signal via a memory, said signal defining a location on said golf course corresponding directly to a location within said memory and correlating the position of said receiver to corresponding data defining said information, said data being predetermined and based solely on said position, said receiver relaying said information derived from said memory to display means for displaying said information to the golfer regarding the distance to designated points on a golf course hole relative to said receiver, said receiver passively providing said information without golfer input as said receiver is moved on said golf course.

2. The golf information system according to claim 1 wherein said receiver comprises:
radio frequency receiver for receiving said signal;

key demodulator means, coupled to said radio frequency receiver, for demodulating said signal and producing an output therefrom; and microprocessor means coupled to said output of said key demodulator means for interpreting said signal and for displaying to the golfer said information from said system memory corresponding to said signal regarding the position and distance of designated points on a golf course hole relative to said receiver.

3. The golf information system according to claim 1 wherein said memory may be modified and wherein said information system further comprises means for modifying said memory to reflect changes in said distance information relative to said designated points.

4. The golf information system according to claim 3 further comprising an input applied to said receiver at the beginning of each round of golf indicating said changes for each of said holes to comprise said modification.

5. The golf information system according to claim 4 further comprising an encoded signal transmitted by a programmable transmitter means, said receiver receiving said input from said programmable transmitter means when passing thereby.

6. The golf information system according to claim 1 further comprises a real-time clock integral to said receiver providing a time-of-day reading.

7. The golf information system according to claim 1 wherein said receiver computes the time duration of play over portions of the golf course.

8. A golf information system providing a golfer with information regarding the distance to designated points relative to various positions on a golf course hole comprising:

a golf cart; and receiver means mounted on said golf cart including antenna means for receiving an encoded signal correlated to the position of said golf cart on the golf course, said receiver means interpreting said encoded signal via a memory, said signal defining a location on said golf course corresponding directly to a location within said memory, said memory correlating each of said encoded signals to corresponding data defining said information, said data being predetermined, said receiver means relaying said information derived from said memory to display means for displaying said information to the golfer regarding the position and distance of designated points on a golf hole course relative to said golf cart, said receiver means passively providing said information without golfer input, and said receiver means further includes a real time clock providing a time-of-day reading.

9. A golf information system providing a golfer with information regarding the distance to designated points relative to various positions on a golf course hole comprising:

a golf cart; and receiver means mounted on said golf cart including antenna means for receiving an encoded signal correlated to the position of said golf cart on the golf course, said receiver means interpreting said encoded signal via a memory, said signal defining a location on said golf course corresponding directly to a location within said memory, said memory correlating each of said encoded signals to corresponding data defining said information, said data being predetermined, said receiver means relaying said information derived from said memory to display means for displaying said information to the golfer regarding the position and distance of designated points on a golf hole course relative to said golf cart, said receiver means passively providing said information without golfer input, and wherein said receiver means also computes the time duration of play over portions of the golf course.

10. A golf information system providing a golfer with information regarding the distance to designated points relative to various positions on a golf course hole comprising:

a moveable receiver including antenna means for receiving at least one encoded signal correlated to the position of said receiver on the golf course, said receiver interpreting said encoded signal via a memory, said memory correlating said encoded signal to corresponding data defining said information, said data being predetermined, said receiver relaying said information derived from said memory to display means for displaying said information to the golfer regarding distance to designated points on a golf course relative to said receiver, said receiver automatically providing said information as said receiver is moved on said golf course, means for modifying said memory to reflect changes in said distance information relative to said designated points, said modification occurring when said receiver receives an input at the beginning of each round of golf as to said changes for each of said holes and, said input being an encoded signal transmitted by a programmable transmitter means wherein said receiver receives said input from said programmable transmitter means when passing thereby.

11. A golf information system providing a golfer with information regarding the distance to designated points relative to various positions on a golf course hole comprising:

a golf cart; and receiver means mounted on said golf cart including antenna means for receiving a signal from which the position of said golf cart on the golf course is determined, said receiver means interpreting said signal via a memory, said signal defining a location on said golf course corresponding directly to a location within said memory, said memory correlating said position to corresponding data defining said information, said data being predetermined, said receiver means relaying said information derived from said memory to display means for displaying said information to the golfer regarding the position and distance of designated points on a golf hole course relative to said golf cart, said receiver means passively providing said information without golfer input, said receiver means further includes a real-time clock providing a time-of-day reading.

12. A golf information system providing a golfer with information regarding the distance to designated points relative to various positions on a golf course hole comprising:

a golf cart; and receiver means mounted on said golf cart including antenna means for receiving a signal from which the position of said golf cart on the golf course is determined, said receiver means interpreting said signal via a memory, said signal defining a location on said golf course corresponding directly to a location within said memory, said memory correlating said position to corresponding data defining said information, said data being predetermined, said receiver means relaying said information derived from said memory to display means for displaying said information to the golfer regarding the position and distance of designated points on a golf hole course relative to said golf cart, said receiver means passively providing said information without golfer input, and wherein said receiver means computes the time duration of play over portions of the golf course.

13. A golf information system providing a golfer with information regarding the distance to designated points relative to various positions on a golf course hole comprising:

a movable receiver including antenna means for receiving at least one signal from which the position of said receiver on the golf course is determined, said receiver interpreting said signal via a modifiable memory, said memory correlating said position to corresponding data defining said information, said data being predetermined and based solely on said position, without additional inputs from said golfer, said receiver relaying said information derived from said memory to display means for displaying said information to the golfer regarding the distance to designated points on a golf course hole relative to said receiver, said receiver automatically providing said information as said receiver is moved on said golf course;

means for modifying said memory to reflect changes in said distance information relative to said designated points;

an input applied to said receiver at the beginning of each round of golf indicating said changes for each of said holes to comprise said modification; and an encoded signal transmitted by a programmable transmitter means, said receiver receiving said input from said programmable transmitter means when passing thereby.

* * * * *